Oct. 6, 1959  C. VAN DEVENTER III  2,907,353
LOOM SHEAVES
Filed Feb. 3, 1956

INVENTOR
Christopher Van Deventer III

BY Swecker + Mathis

ATTORNEYS

2,907,353
LOOM SHEAVES

Christopher Van Deventer III, Knoxville, Tenn., assignor to National Plastics, Inc., Knoxville, Tenn., a corporation of Delaware Application February 3, 1956, Serial No. 563,232

14 Claims. (Cl. 139—82)

This invention relates to loom sheaves, and more particularly, to loom sheaves mounted for rotation by anti-friction bearings.

Sheaves have for a long time been employed in looms as guides for flexible connectors between various parts. Such connectors often are employed in shedding mechanisms and in shifting shuttle box motions.

Prior to the present invention, the loom sheaves used in ordinary commercial practice have been mounted upon sleeve-type bearings, and in some instances, the sleeves have been lubricated with a lubricant. This type of mounting has not been entirely satisfactory. In most instances, the flexible connectors, guided by the sheaves, move back and forth in fairly short strokes, and the sheaves oscillate about their axes distances less than complete revolutions. This type of motion tends to cause uneven wear in sleeve bearings.

Another factor which has contributed to the rapid deterioration of the sheaves used heretofore has been the severe vibrations which occur during the operation of a loom. Sleeve bearings do not possess the flexibility necessary to accommodate such vibrations.

It is an object of this invention to provide loom sheaves with anti-friction bearings which are durable and efficient in operation.

Another object of this invention is to provide loom sheaves with anti-friction bearings suitably sealed against the entrance of lint, or the like, into the zone of operation of the rolling bearing elements.

A more specific object of this invention is to provide a ball bearing unit, and a loom sheave equipped with such a unit, which will accommodate vibrations such as those found in looms, and will minimize the stresses and wear caused by such vibrations.

Still another object of this invention is to provide an assembly of loom sheaves which can be made up quickly and accurately with a minimum number of tools.

The foregoing and other objects may be realized, according to one embodiment of the invention, in a harness cord sheave assembly extending between the front and back arches of a loom. The assembly may include a shaft attached to the arches and providing a support for a plurality of sheaves. Each sheave is carried by the outer race of a ball bearing unit, the inner race of which surrounds the shaft and extends beyond the ends of the sheave. With this arrangement the inner races of the bearings serve to space the sheaves from each other along the axis of the shaft.

The lint is kept from the zone of the balls of each bearing by annular seals of flexible material extending between the inner race of the ball bearing and the inner periphery of the sheave associated therewith.

Vibrations are accommodated, according to the present invention, by the provision of an axially elongated ball groove in at least one of the races of the bearing. This groove permits the balls to move axially as well as circumferentially with respect to the shaft.

A better understanding of the invention and its many objects and advantages will be gained from the following detailed description of an embodiment thereof illustrated in the accompanying drawings, in which.

Figure 1:
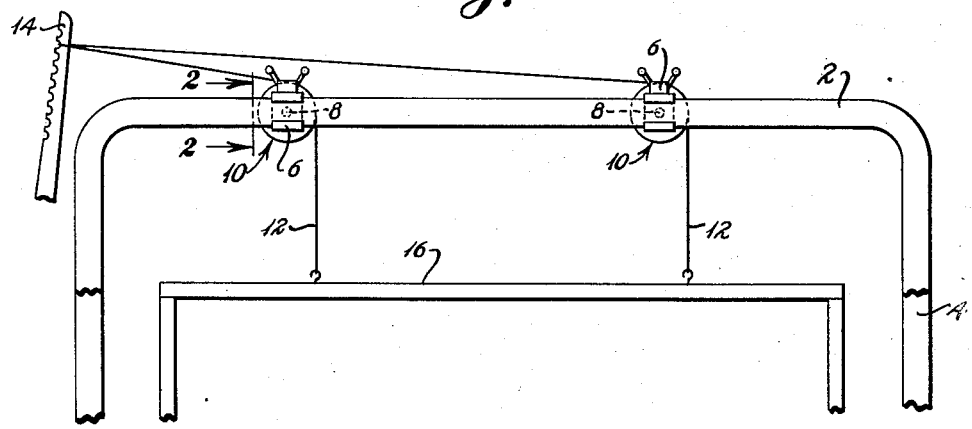
Fig. 1 is a front elevational view of a portion of a loom having the invention applied thereto.

Referring first to Fig. 1, a person skilled in the art will recognize at once the front arch 2 and the rear arch 4 which form the upwardly extending portions of a conventional loom frame. Secured to these arches are clamps or blocks 6 which serve as mountings for shafts 8 extending between the arches 2 and 4.

Each of the shafts 8 carries a plurality of sheaves designated generally by the numeral 10, which serve as guides for flexible connectors or harness cords 12. These cords 12 serve to transmit motion from the harness jacks 14 of some suitable control mechanism, such as a dobby or a Knowles head, to the harness frames 16.

The arrangement just described is well known in the art and requires no further amplification. It will be understood that the present invention has utility in connection with all of the various sheave arrangements employed in looms, and that the illustration in Fig. 1 is intended as an example only.

Figure 2:
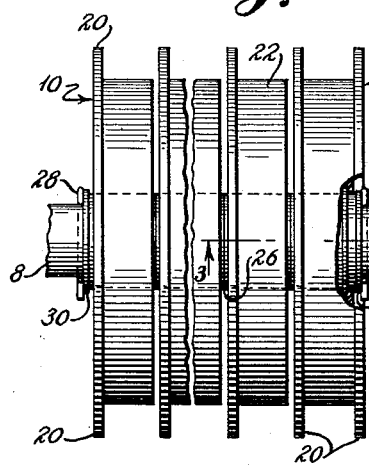
Fig. 2 is a side elevational view, taken along the line 2—2 in Fig. 1, of a sheave assembly according to the present invention, with certain parts being broken away.

Fig. 2 shows an assembly of sheaves 10. One of the sheaves, designated by the numeral 18, has a pair of flanges 20 on its periphery to confine the harness cord 12 passing thereover. The remaining ones of the sheaves, i.e., those designated by the numeral 22, have only one peripheral flange 20, and adjacent ones of the flanges cooperate to define the zones in which the cords 12 may move.

Figure 3:
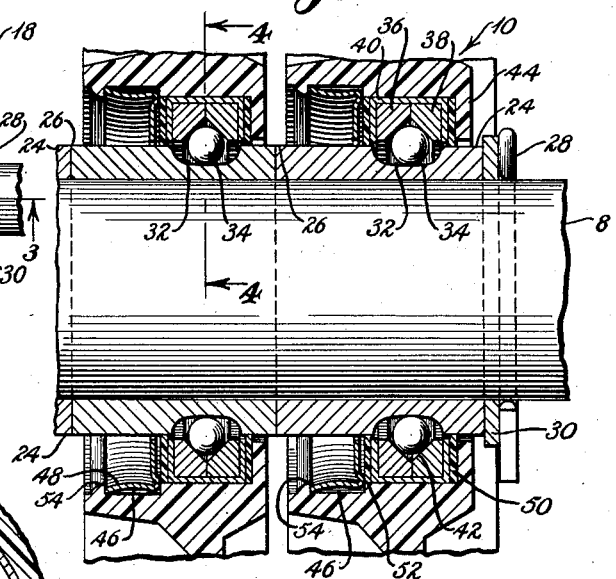
Fig. 3 is a sectional view taken along the line 3—3 in Fig. 2.
Figure 4:
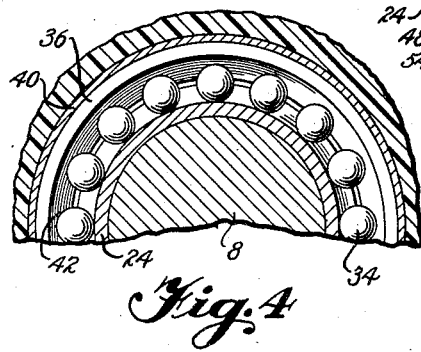
Fig. 4 is a sectional view taken along the line 4—4 in Fig. 3.

The sheaves are mounted on the shaft 8 by means of ball bearings, best shown at Figs. 3 and 4. Each ball bearing unit includes a sleeve 24 surrounding the shaft 8. The diameter of each sleeve 24 is such that it cooperates with the shaft 8 to form either a slip fit or a slight press fit.

The sleeves 24 have axial lengths greater than the sheaves they carry. As a result, the sleeves 24 extend laterally beyond the sheaves, and they may serve the function of spacers in addition to their ordinary function as a part of the ball bearing unit. The sleeves 24 are arranged in end-to-end relation along the shaft 8, abutting one another, as indicated by the numerals 26, in zones between adjacent ones of the sheaves. The sleeves are held in this relationship by cotter pins 28 extending through holes in the shaft 8. Washers 30 preferably are positioned between the cotter pins 28 and the endmost ones of the sleeves 24.

Each of the sleeves 24 is provided with an axially elongated groove 32 extending entirely around its circumference. This groove is adapted to receive therein ball bearing elements 34 of a diameter significantly shorter than the axial length of the groove 32.

The diameters of the balls 34 also bear a definite relationship to the diameter of the groove 32. Since, as pointed out above, the sheaves 10 usually do not complete a revolution in the course of an oscillation of the harness cords 12, the balls 34 must be sufficiently small to make at least one complete revolution as the sheave carried thereby makes less than a complete revolution.

The outer race of each ball bearing unit is shown as a composite structure made of a pair of rings 36 and 38, held together by a cap 40. The configuration of the rings 36 and 38 is such that the assembled outer race includes a groove 42 extending entirely around its inner periphery. This groove accommodates the balls 34.

As shown, the groove 42 has angular walls which tend to confine the balls 34 against axial movement with respect to the outer race. It will be understood, however, that this relationship is not essential. The outer race may include a groove shaped like the groove 32 in the inner race of the ball bearing. Moreover, if desired, the outer race might be provided with an elongated groove, while the inner race was provided with a short groove.

Although the bearing unit of this invention is similar in some respects to the familiar self-aligning shaft bearing, certain differences will be evident. The axially elongated groove 32 has a relatively flat bottom, so that in moving from one axial zone to another, the balls do not experience large radial deflections. This permits the clearances to be chosen so that an entire group of bearing balls 34 may be moved axially along the inner race in a plane perpendicular to the axis of the inner race. In other words, the sheave need not tilt in order to accommodate axial movement of the balls 34 in response to vibration of the loom.

The fact that the sheaves need not tilt when mounted according to the present invention is particularly advantageous in connection with plastic sheaves. It is contemplated that the sheaves of the present invention may be molded from phenol formaldehyde, or other resins, having a glass fiber filler therein. The stresses and wear on such sheaves are minimized by the use of the particular mounting disclosed herein.

The inner periphery of each sheave 10 includes a flange 44 at one end and a groove 46 near the other end thereof. The flange 44 serves to prevent the passage of the sheave over the ball bearing unit in one direction, and the recess 46 receives a resilient annular retainer 48 which serves to prevent the passage of the sheave over the ball bearing unit in the opposite direction. Annular seals 50 and 52 of neoprene are located on opposite sides of the outer race of the ball bearing, and extend between the inner periphery of the sheave 10 and the outer periphery of the sleeve 24 associated therewith. These seals 50 and 52 contribute significantly to the successful operation of the sheaves of the present invention in that they prevent the entrance of lint into the zone occupied by the bearing balls. They also may serve to prevent the passage of lubricants from the ball zones out of the bearings and onto the cloth.

In assembling a sheave 10 and a ball bearing unit, a seal 50 is inserted into the end of the sheave opposite the flange 44 and pushed into engagement with the inner face of the flange. Then, the ball bearing unit is inserted into the sheave so that the outer race of the ball bearing forms a forced fit with the inner periphery of the sheave. Next, the seal 52 is inserted.

The final step in the assembling operation is accomplished by the insertion of the retainer 48. This retainer preferably is of metal and is shaped so as to give it sufficient flexibility to permit it to be deformed so as to pass the shoulder 54 defining the outer wall of the recess 46. After passing this shoulder, the retainer 48 springs radially into the position shown in Fig. 3, and serves to hold the outer race of the ball bearing against axial movement relative to the sheave 10.

The arrangement of the sheave and ball bearing units upon the shaft 8 can be accomplished very quickly and easily. All that need be done is to insert one of the cotter pins 28 into the shaft 8, then to slide the washers 30 and sleeves 24 of the ball bearing units onto the shaft in proper order, and finally, to insert the remaining cotter pin 28 into the shaft.

Although a single embodiment of the invention has been illustrated and described in detail, various modifications and alterations will be apparent to persons skilled in the art. It is intended, therefore, that the foregoing detailed description should be considered as exemplary only, and that the scope of the invention be determined from the claims which follow.

I claim:

1. In a harness mechanism for a loom having an arch, the improvement which comprises a shaft secured to said arch and extending transversely therefrom, a plurality of sleeves disposed on said shaft in end-to-end contact with each other and having ball grooves in their outer surfaces, a group of bearing balls disposed in each of said grooves, outer race means of lesser axial extent than said sleeves supported by each of said groups of bearing balls for rotation relative to said shaft and relative to each other, and a harness sheave of lesser axial extent than one of said sleeves fixed to each of said outer race means.

2. In a harness mechanism for a loom having an arch, the improvement which comprises a shaft secured to said arch and extending transversely therefrom, a plurality of sleeves disposed on said shaft in end-to-end contact with each other and having ball grooves in their outer surfaces, a group of bearing balls disposed in each of said grooves, outer race means of lesser axial extent than said sleeves supported by each of said groups of bearing balls for rotation relative to said shaft and relative to each other, a harness sheave of lesser axial extent than one of said sleeves fixed to each of said outer race means, and seals extending radially from said sleeves on opposite sides of each of said groups of balls to prevent the entrance of foreign materials into the zones occupied by said bearing balls.

3. In a harness mechanism for a loom having an arch, the improvement which comprises a shaft extending transversely from said arch, means for securing one end portion of said shaft to said arch, stop means on opposite end portions of said shaft, a plurality of sleeves on said shaft in end-to-end contact with each other and completely filling the space between said stop means, each of said sleeves having a groove in its outer surface, a group of rollable bearing elements disposed in each of said grooves, an outer race unit supported by each of said groups of bearing elements for rotation relative to said sleeves and relative to each other, and a harness sheave carried by each of said outer race units.

4. In a loom having a frame, a flexible connector, and means for moving said connector a predetermined distance in one direction and then returning it to its original position, the improvement which comprises a shaft supported by said frame, ball bearing means on said shaft, and a sheave mounted on said bearing means with its periphery in the path of movement of said flexible connector and having a diameter such that movement of said connector through said predetermined distance causes said sheave to move angularly less than one complete revolution, said ball bearing means including a plurality of balls each of which has a diameter such that it makes at least one complete revolution as the periphery of said sheave and said connector move through said predetermined distance.

5. In a loom having a frame, a flexible connector, and means for moving said connector a predetermined distance in one direction and then returning it to its original position, the improvement which comprises a shaft supported by said frame, ball bearing means on said shaft, and a sheave mounted on said bearing means with its periphery in the path of movement of said flexible connector, said ball bearing means including an inner race having an axially elongated circumferential groove, an outer race, and a plurality of balls disposed in said groove and extending between said inner and outer races, each of said balls having a diameter substantially less than the axial extent of said groove so that said balls may shift axially of said groove in response to the vibrations of the loom.

6. In a loom having a frame, a flexible connector and means for moving said connector a predetermined distance in one direction and then returning it to its original position, the improvement which comprises a shaft supported by said frame, ball bearing means on said shaft, and a sheave mounted on said bearing means with its periphery in the path of movement of said flexible connector, said ball bearing means including an inner race having a circumferential groove, an outer race having a groove extending about its inner periphery, one of said grooves being elongated in an axial direction, and a group of bearing balls extending into both of said grooves, said balls and said races having diameters such that said group of balls may move axially along said elongated groove while the group is disposed in substantially perpendicular relation to the axis of said shaft, whereby said outer race and said sheave may move axially relative to said shaft in response to loom vibrations.

7. In a loom having a frame, a flexible connector, and means for moving said connector a predetermined distance in one direction and then returning it to its original position, the improvement which comprises a shaft supported by said frame, a sleeve fixedly positioned on said shaft and having an axially elongated circumferential groove, a group of bearing balls disposed in said groove, each of said balls having a diameter substantially less than the axial extent of said groove, an outer race unit of lesser axial extent than said sleeve and having a groove in its inner periphery for receiving said balls, a plastic sheave having an inner periphery supported by said outer race unit and an outer periphery in the path of movement of said flexible connector, said inner periphery including a radially extending flange near one end thereof and a radially extending recess near the other end thereof, and a resilient retainer disposed in said recess and extending radially therefrom to hold said outer race unit in a position between said flange and said retainer.

8. In a loom having a frame, a flexible connector, and means for moving said connector a predetermined distance in one direction and then returning it to its original position, the improvement which comprises a shaft supported by said frame, a sleeve fixedly positioned on said shaft and having an axially elongated circumferential groove, a group of bearing balls disposed in said groove, each of said balls having a diameter substantially less than the axial extent of said groove, an outer race unit of lesser axial extent than said sleeve and having a groove in its inner periphery for receiving said balls, a sheave having an inner periphery supported by said outer race unit and an outer periphery in the path of movement of said flexible connector, said inner periphery including a radially extending flange near one end thereof and a radially extending recess near the other end thereof, and a resilient retainer disposed in said recess and extending radially therefrom to hold said outer race unit in a position between said flange and said retainer.

9. In combination, a loom sheave, a ball bearing unit disposed within said sheave, and means for securing said bearing unit in position on said sheave, said bearing unit including an inner race mounted for rotation relative to said sheave and for axial movement relative to said sheave.

10. The combination which comprises a shaft, a plurality of loom sheaves surrounding said shaft, a ball bearing unit disposed within each of said sheaves and serving to mount said sheaves for rotation relative to said shaft, means for securing each of said bearing units relative to its sheave, each of said bearing units including an inner race contacting said shaft and extending axially beyond both ends of its sheave, and means for holding the inner races of said bearing units in end-to-end contact with each other.

11. In combination, a loom sheave the inner periphery of which includes a radially extending flange near one end thereof and a radially extending recess near the other end thereof, an anti-friction bearing unit disposed within said sheave and having an outer race in engagement with a portion of said inner periphery between said flange and said recess, said bearing unit also having an inner race of greater axial extent than said outer race, a first annular seal extending between said inner periphery of said sheave and the outer surface of said inner race in the space between said flange and said outer race, a resilient retainer in said recess extending radially inwardly therefrom to prevent the passage of said outer race out of the end of said sheave adjacent said recess, and a second annular seal extending between said inner periphery of said sheave and the outer surface of said inner race in the space between said retainer and said outer race.

12. In a loom having a frame, a flexible connector, and means for moving said connector a predetermined distance in one direction and then returning it to its original position, the improvement which comprises a shaft supported by said frame, anti-friction bearing means on said shaft, and a sheave mounted on said bearing means with its periphery in the path of movement of said flexible connector and having a diameter such that movement of said connector through said predetermined distance causes said sheave to move angularly less than one complete revolution, said bearing means including a plurality of rollable bearing elements each of which has a diameter such that it makes at least one complete revolution as the periphery of said sheave and said connector move through said predetermined distance.

13. In a loom having a frame, a flexible connector, and means for moving said connector, the improvement which comprises a shaft supported by said frame, ball bearing means on said shaft, and a sheave mounted on said bearing means with its periphery in the path of movement of said flexible connector, said ball bearing means including an inner race having a circumferential groove, an outer race having a groove extending about its inner periphery, one of said grooves being elongated in an axial direction, and a group of bearing balls extending into both of said grooves, each of said balls having a diameter substantially less than the axial extent of said elongated groove so that said balls may shift axially of said elongated groove in response to vibrations of the loom.

14. In a loom having a frame, a flexible connector, and means for moving said connector a predetermined distance in one direction and then returning it to its original position, the improvement which comprises a shaft supported by said frame, ball bearing means on said shaft, and a sheave mounted on said bearing means with its periphery in the path of movement of said flexible connector and having a diameter such that movement of said connector through said predetermined distance causes said sheave to move angularly less than one complete revolution, said ball bearing means including an inner race having a circumferential groove, an outer race having a groove extending about its inner periphery, one of said grooves being elongated in an axial direction, and a group of bearing balls extending into both of said grooves, each of said balls having a diameter such that it may move axially along said elongated groove in response to loom vibrations and such that it makes at least one complete revolution as the periphery of said sheave and said connector move through said predetermined distance.

References Cited in the file of this patent

UNITED STATES PATENTS

| | | |
|---|---|---|
| 281,157 | Stearns | July 10, 1883 |
| 1,141,201 | Munson | June 1, 1915 |
| 1,517,060 | Hanson | Nov. 25, 1924 |
| 1,852,078 | Gordon | Apr. 5, 1932 |
| 2,182,247 | Catland | Dec. 5, 1939 |
| 2,379,742 | Payne | July 3, 1945 |
| 2,379,743 | Payne | July 3, 1945 |
| 2,403,176 | Griffith | July 2, 1946 |
| 2,404,084 | Norton | July 16, 1946 |
| 2,421,685 | Crot et al. | June 3, 1947 |
| 2,499,131 | Coles | Feb. 28, 1950 |